Aug. 23, 1960

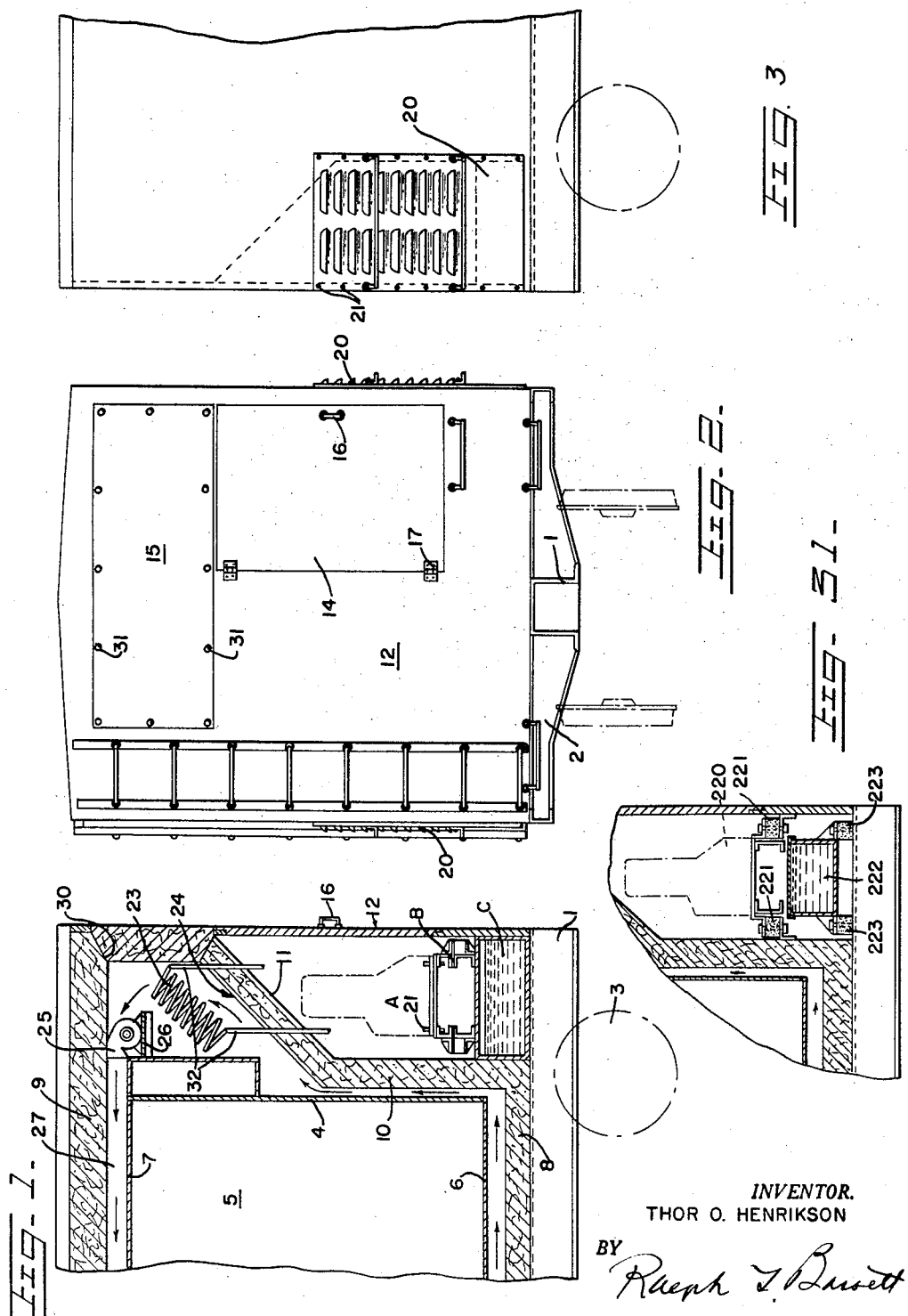

T. O. HENRIKSON 2,949,751

MECHANICAL REFRIGERATOR CARS

Filed Sept. 6, 1957

INVENTOR.
THOR O. HENRIKSON

BY Ralph L. Bassett

ATTORNEY

Aug. 23, 1960 T. O. HENRIKSON 2,949,751
MECHANICAL REFRIGERATOR CARS
Filed Sept. 6, 1957 12 Sheets-Sheet 3
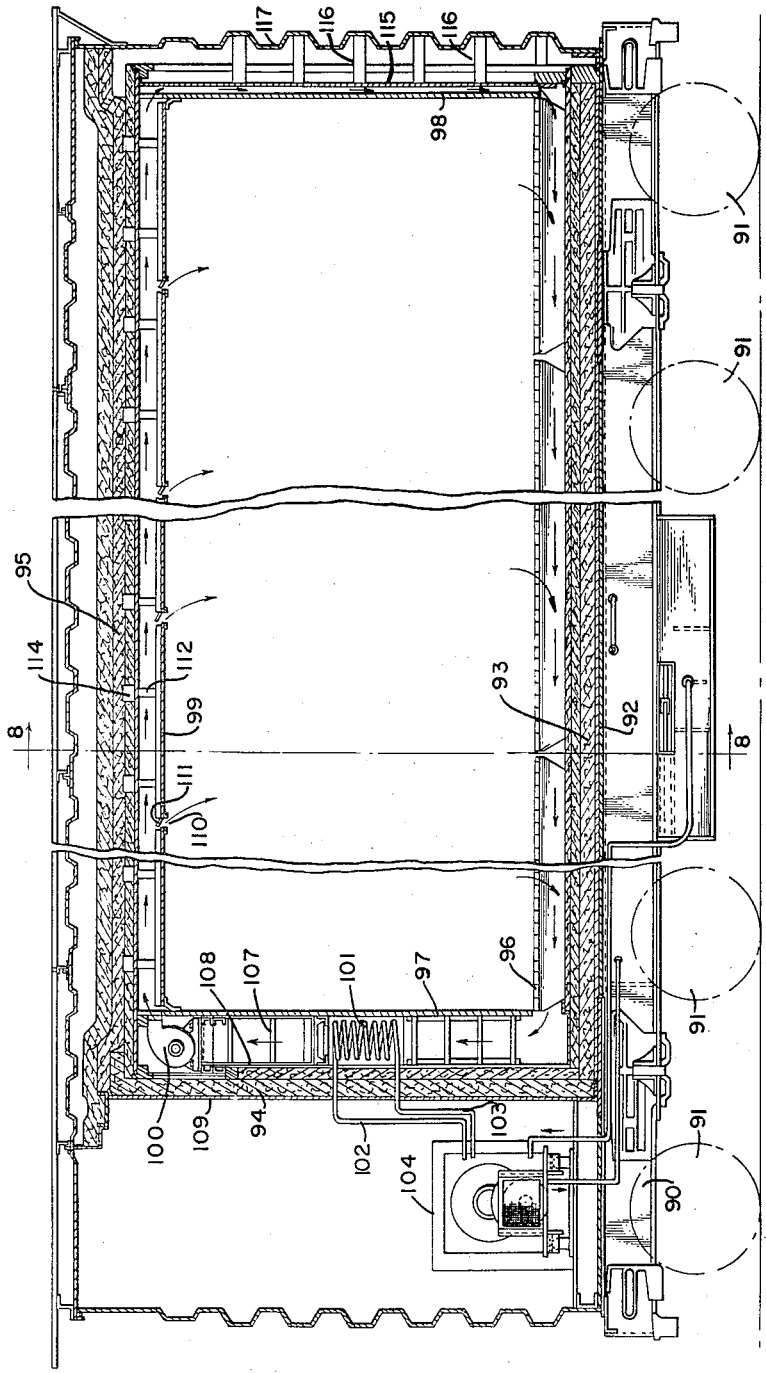
INVENTOR.
THOR O. HENRIKSON
BY
ATTORNEY Aug. 23, 1960
T. O. HENRIKSON
2,949,751
MECHANICAL REFRIGERATOR CARS
Filed Sept. 6, 1957
12 Sheets-Sheet 4
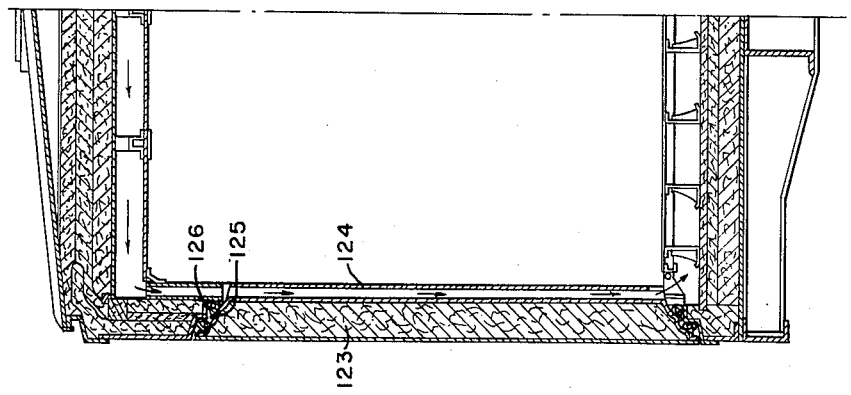
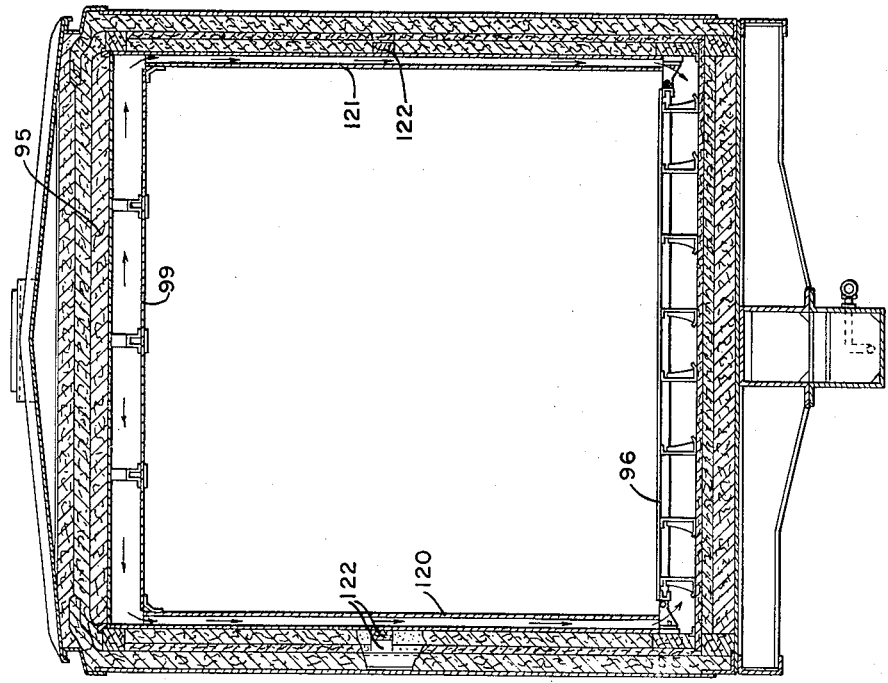
INVENTOR.
THOR O. HENRIKSON
BY
ATTORNEY Aug. 23, 1960  T. O. HENRIKSON  2,949,751
MECHANICAL REFRIGERATOR CARS
Filed Sept. 6, 1957  12 Sheets-Sheet 5
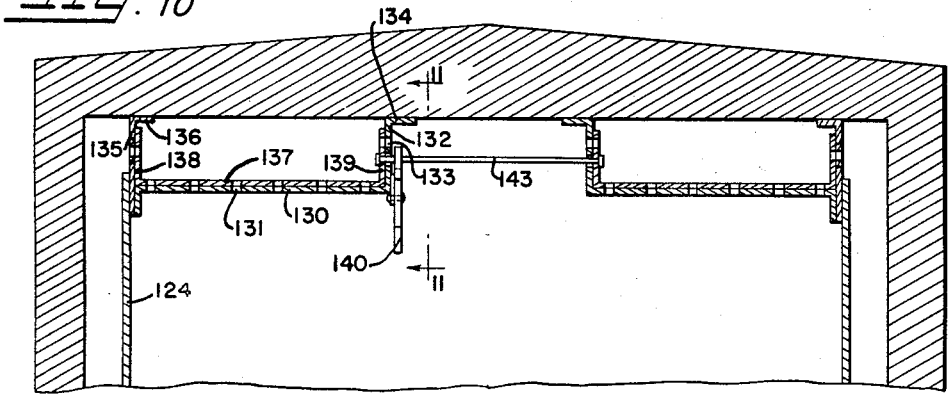
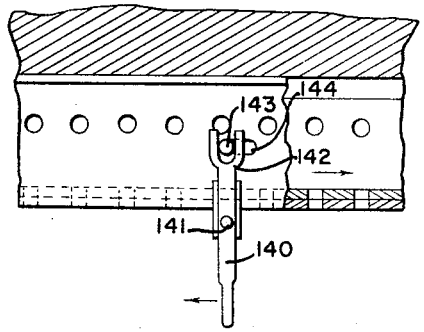
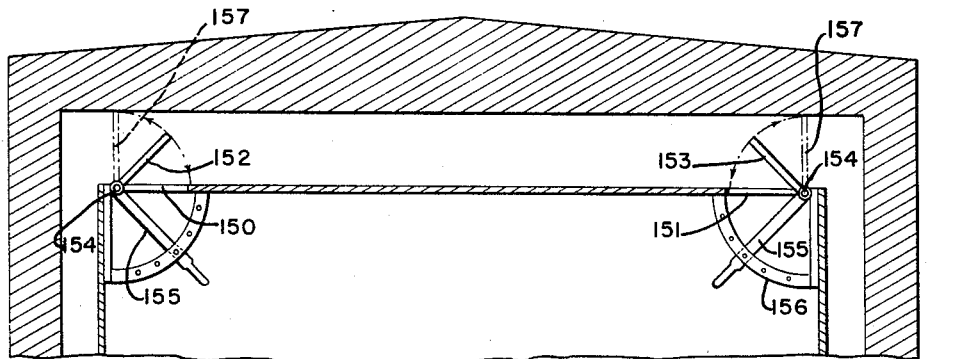
INVENTOR
THOR O. HENRIKSON
BY
ATTORNEY Aug. 23, 1960 T. O. HENRIKSON 2,949,751
MECHANICAL REFRIGERATOR CARS
Filed Sept. 6, 1957 12 Sheets-Sheet 6

INVENTOR
THOR O. HENRIKSON

BY *Ralph L. Bassett*

ATTORNEY

Aug. 23, 1960 T. O. HENRIKSON 2,949,751
MECHANICAL REFRIGERATOR CARS
Filed Sept. 6, 1957 12 Sheets-Sheet 7
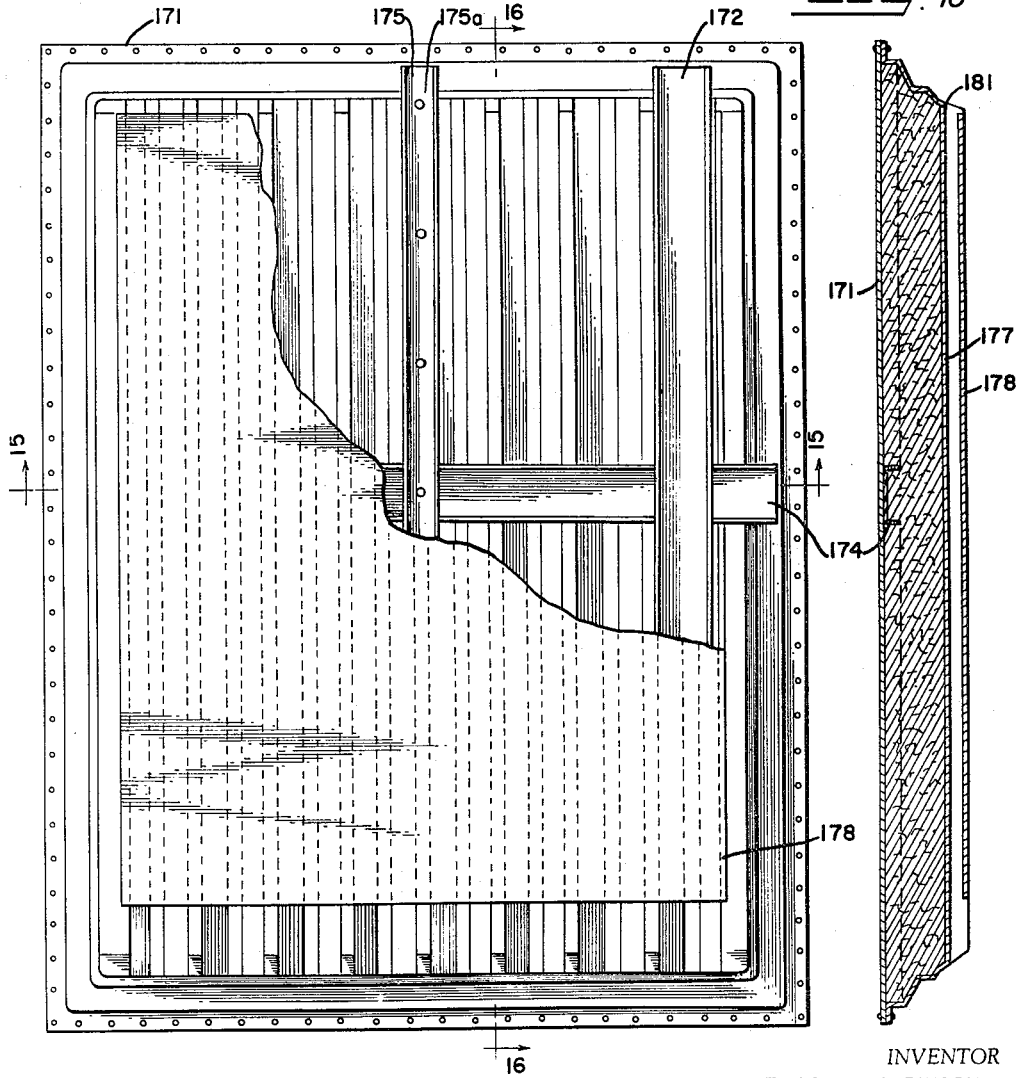
INVENTOR
THOR O. HENRIKSON
BY
ATTORNEY

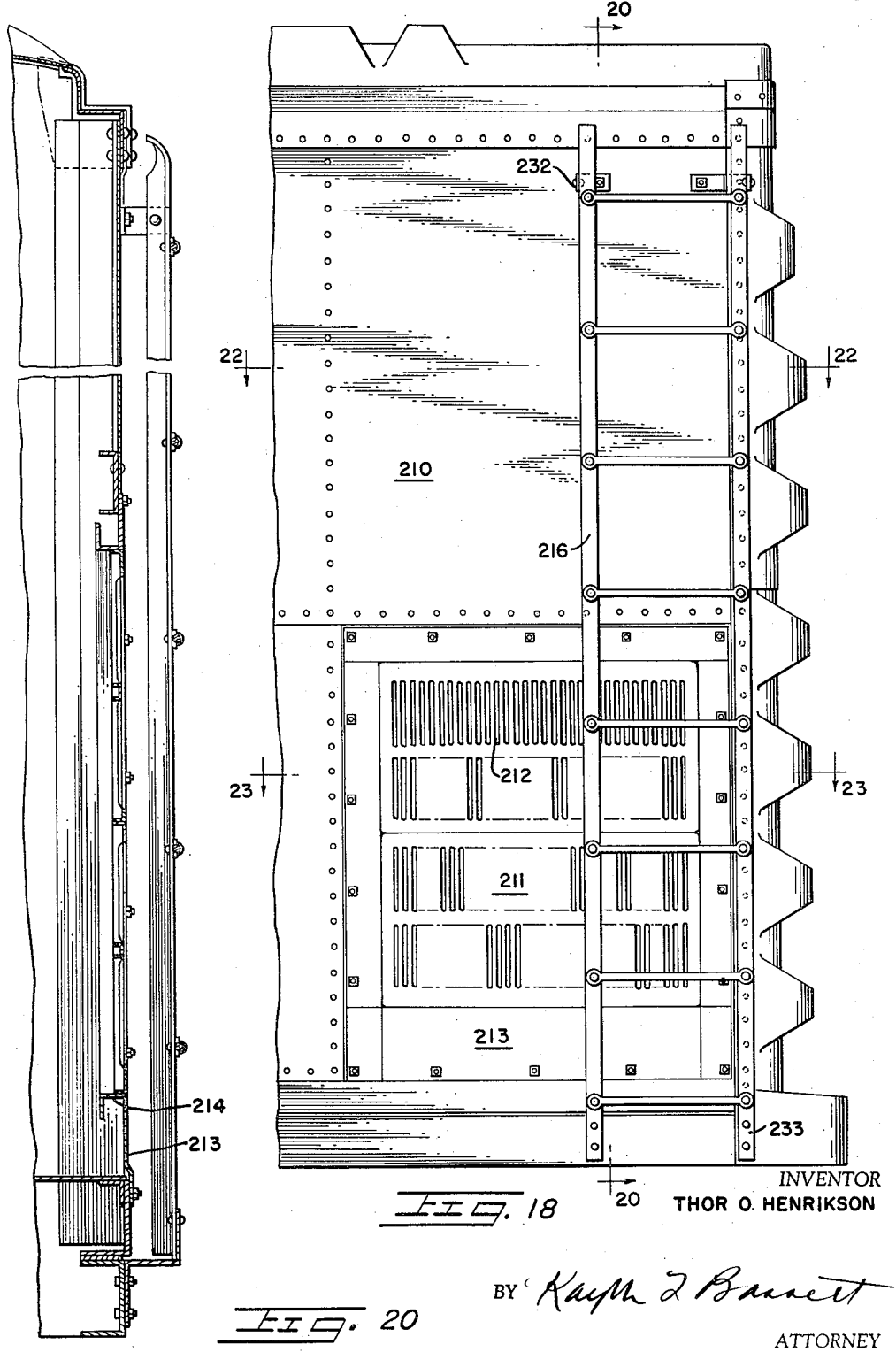

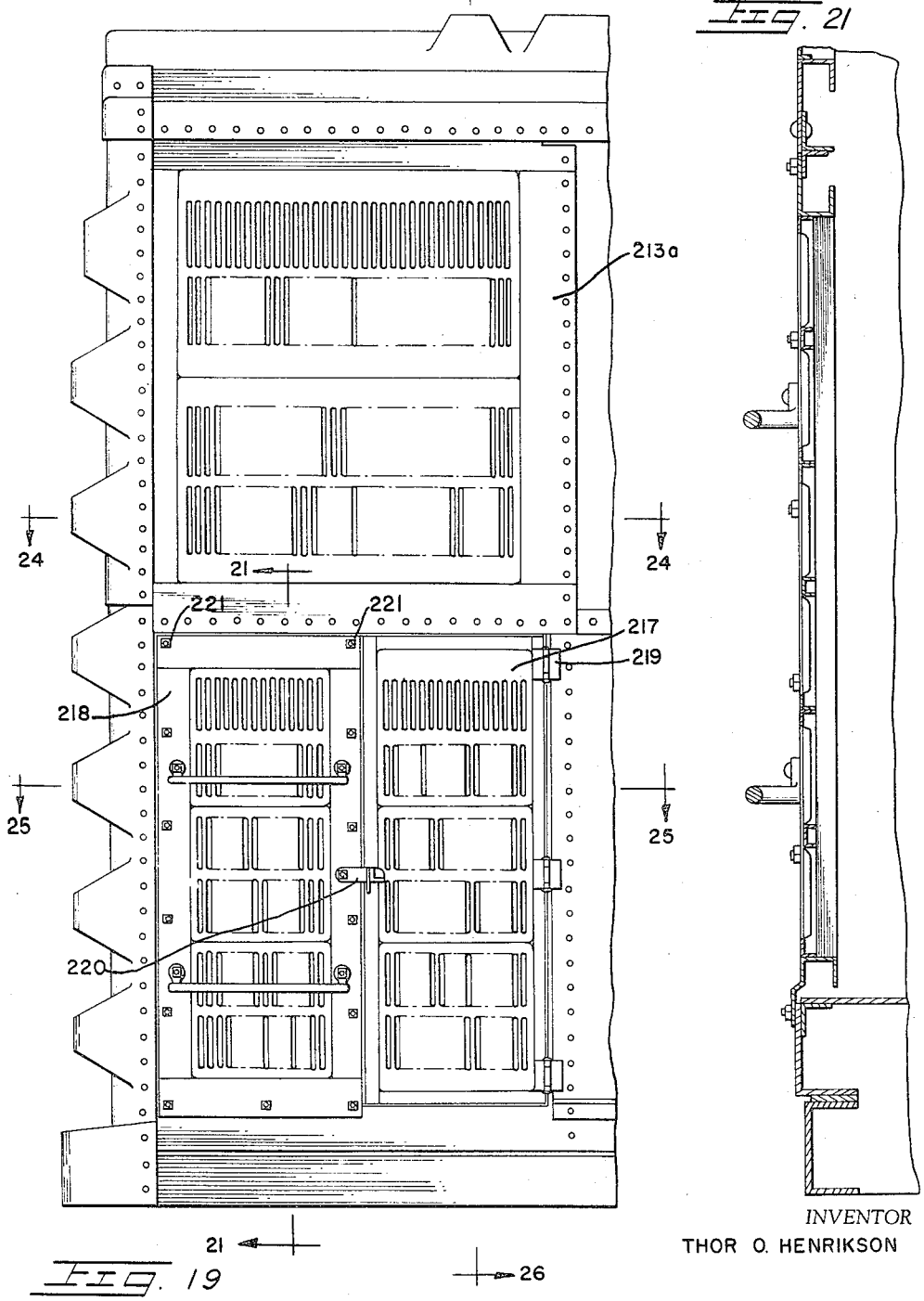

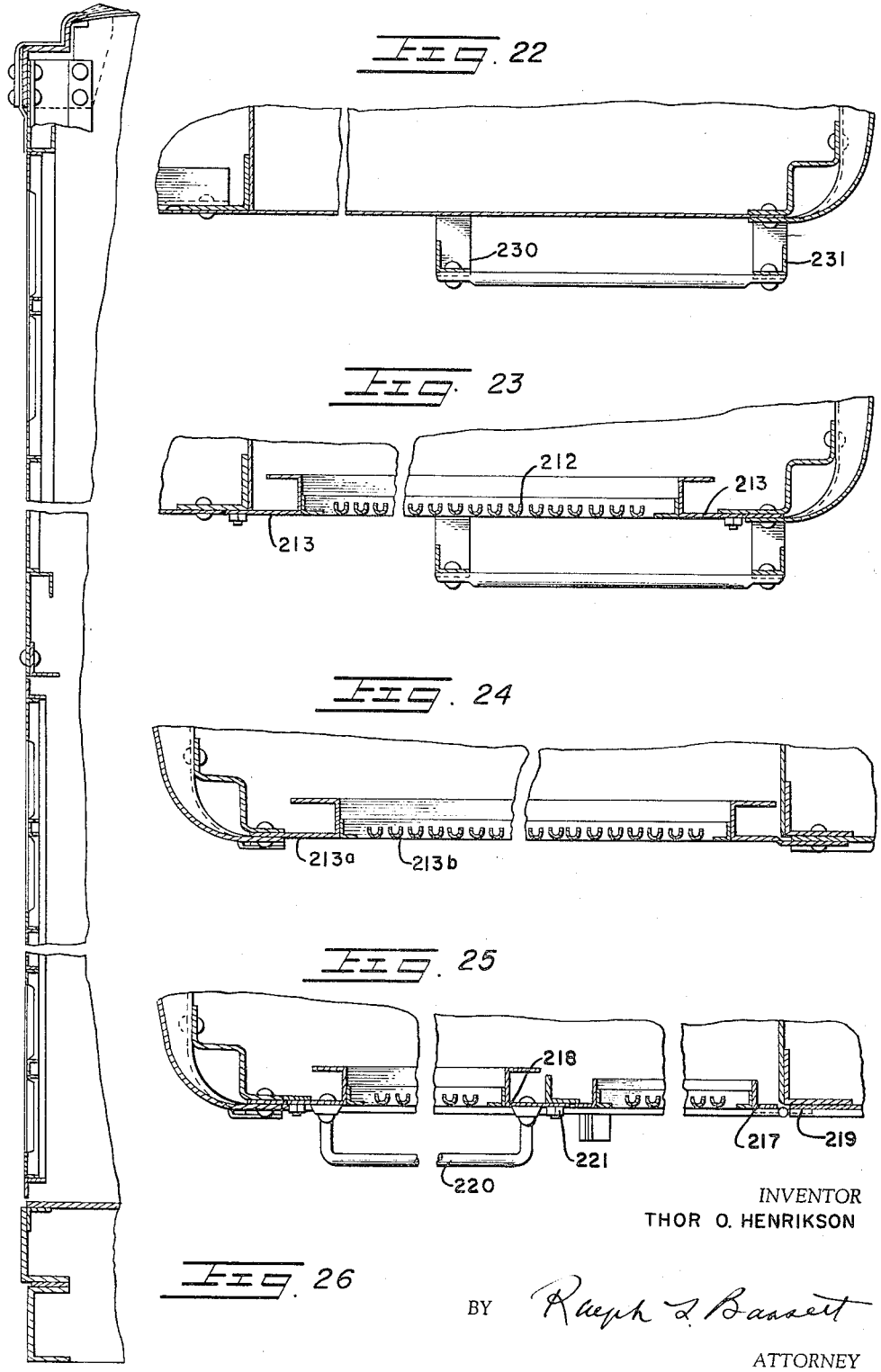

Aug. 23, 1960 T. O. HENRIKSON 2,949,751
MECHANICAL REFRIGERATOR CARS
Filed Sept. 6, 1957 12 Sheets-Sheet 11
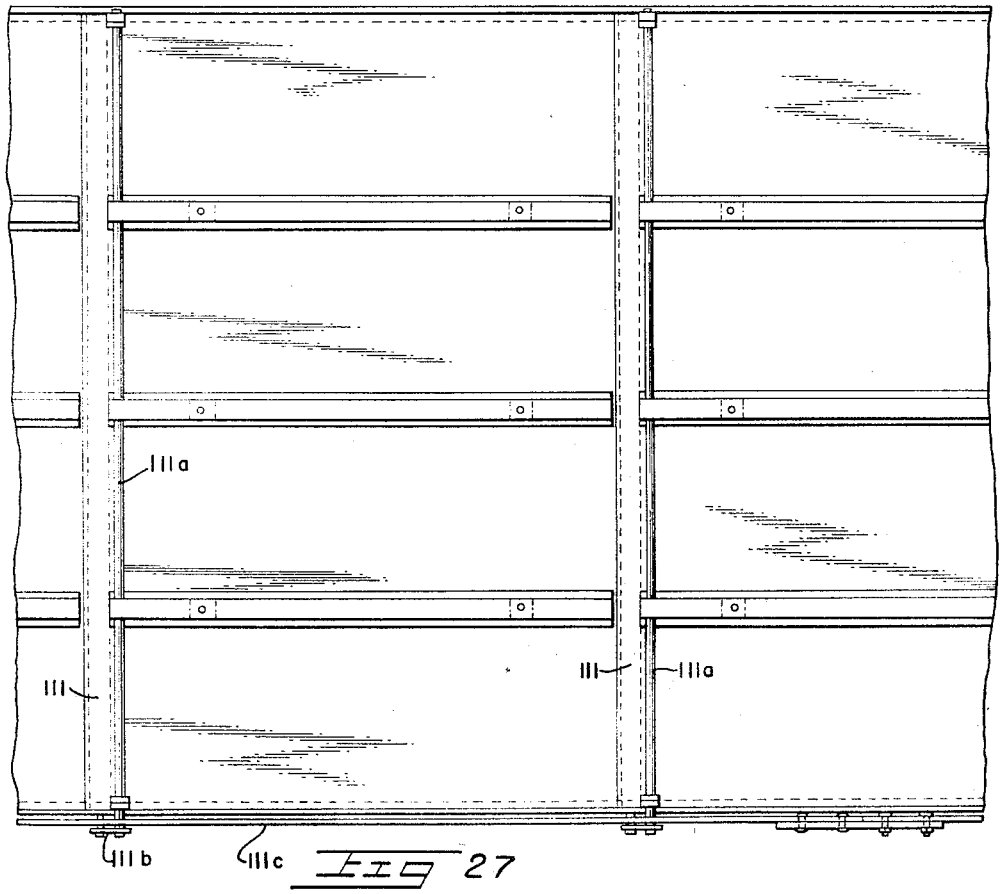
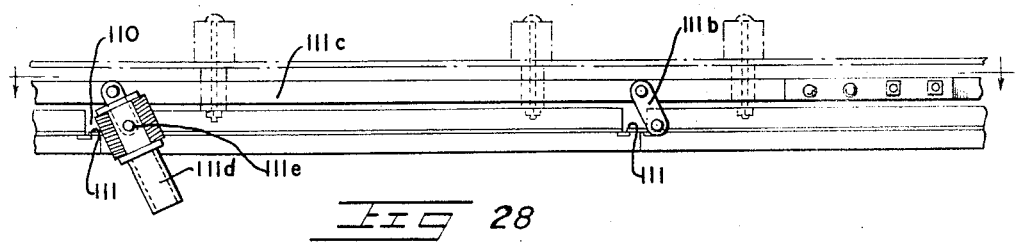
INVENTOR.
THOR O. HENRIKSON
ATTORNEY Aug. 23, 1960 T. O. HENRIKSON 2,949,751
MECHANICAL REFRIGERATOR CARS
Filed Sept. 6, 1957 12 Sheets-Sheet 12

INVENTOR.
THOR O. HENRIKSON
BY
ATTORNEY

United States Patent Office 2,949,751
Patented Aug. 23, 1960

2,949,751

MECHANICAL REFRIGERATOR CARS

Thor O. Henrikson, Seattle, Wash., assignor to Pacific Car and Foundry Company, Renton, Wash.

Filed Sept. 6, 1957, Ser. No. 682,525

4 Claims. (Cl. 62—239)

This invention relates to mechanical refrigerator cars. Generally the development of mechanical refrigerator cars has been brought about by the adaptation of mechanical refrigeration to conventional car structures, as for instance, by the removal of ice bunkers from within the standard car and the arrangement of a compartment, in lieu of the ice bunker, in which is installed the mechanical equipment. In mechanical refrigerator cars built in this manner there has not only been a considerable loss of space due to the necessity of providing a working area adjacent the mechanical equipment for regulation and repair, but an additional drawback has been in locating, arranging and supporting the fuel tanks which furnish the fuel to the motor of the mechanical equipment. Generally fuel tanks have been suspended under the car which necessitates piping from the tanks to the power plant and this has been modified by the provision of two tanks, one at each side of the car to obtain the best transverse equilibrium. This latter arrangement, of course, calls for cross-over piping arrangements which add to complications and costs. It will also be obvious that outside suspended tanks and their piping are exposed to weather and provision for heating electrically or by other means would be costly and impractical. It is not uncommon for the present exposed suspended fuel tank, either single or double equipment, to cause shut downs with serious consequences to the lading where the temperature has been low enough to change the viscosity of the fuel so that it will not flow freely through the feeder lines.

It is for the purpose of overcoming these and other objectionable features of conventional mechanical refrigerating equipment and fuel supply therefor that the present invention has resulted and, likewise, the present concept results in a general reduction in overall cost of the car and permits a general increase in the car lading capacity.

One of the primary objects of the present invention is to provide what might be termed a package assembly, including the fuel supply tank, the compressor condenser unit and the power equipment therefor, all installed in a compartment or housing on a platform at one end of the standard car with provision for removal and replacement of these parts and for adjustment and repair from without the car.

Another object of the invention is to provide means whereby exposure of the fuel handling equipment is avoided and the temperature of the fuel is subject to temperature control, thus insuring uniform feed from the supply to the engine.

Another object of the invention is to provide a novel mounting for the compressor condenser unit and its power plant so that the parts of this equipment are immediately available for adjustment and repair from without the car and without removal of the units from their support on the car framing.

A further object of the invention is to provide a mounting for a mechanical refrigerating unit and its fuel supply which will provide perfect transverse equilibrium.

It is another object of the invention to so construct and arrange the mechanical refrigerating unit that the evaporator can be placed at any height and either horizontally or vertically to provide maximum efficiency in producing the desired results.

These and other objects will more clearly hereinafter appear by reference to the accompanying drawings forming a part of the instant specification, wherein like characters of reference designate corresponding parts throughout the several views, in which:

Fig. 1 is a fragmentary vertical sectional view through one end of a refrigerator car embodying one form of the present invention;

Fig. 2 is an end elevation of the structure shown in Fig. 1;

Fig. 3 is a fragmentary end elevation of one side of the disclosure of Fig. 1;

Fig. 7 is a longitudinal section through a railway car constructed in accordance with the invention with a modified form of mechanical refrigerating unit arrangement;

Fig. 8 is a transverse section on line 8—8 of Fig. 7;

Fig. 9 is a fragmentary transverse section through a refrigerator car constructed in accordance with the present invention, the section being taken through the car door assembly;

Fig. 10 is a fragmentary vertical section through the upper part of the car showing a form of structure for controlling the distribution of the refrigerated air;

Fig. 11 is a section on line 11—11 of Fig. 10;

Fig. 12 is a fragmentary vertical section showing a modified form of refrigerated air control;

Fig. 14 shows an elevation partly in section of a door used in connection with the present refrigerated car design;

Fig. 15 is a section on line 15—15 of Fig. 14;

Fig. 16 is a section on line 16—16 of Fig. 14;

Fig. 18 is a fragmentary end elevation showing a car end embodying the mechanical refrigerating unit;

Fig. 19 is a similar view of the other side of the car end disclosed in Fig. 18;

Figure 30:
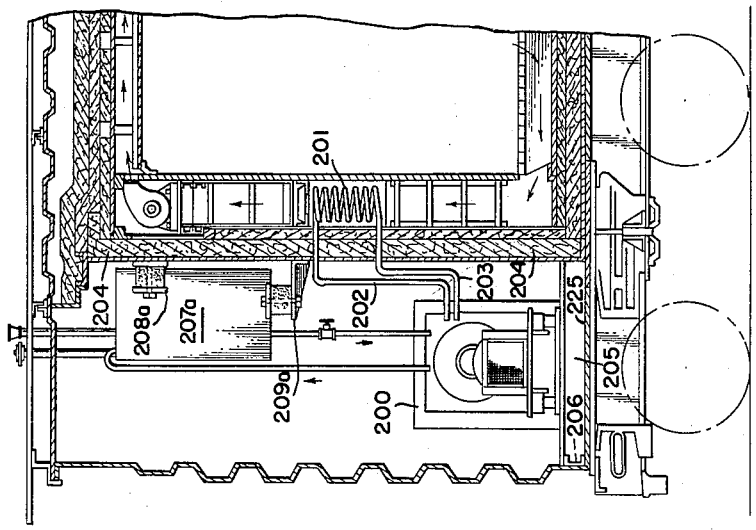
Figure 29:
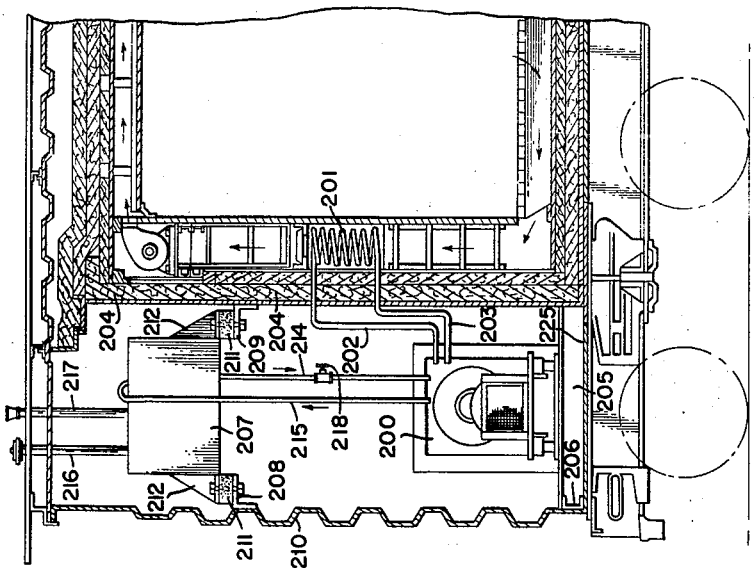

Fig. 20 is a section on line 20—20 of Fig. 18;
Fig. 21 is a section on line 21—21 of Fig. 19;
Fig. 22 is a section on line 22—22 of Fig. 18;
Fig. 23 is a section on line 23—23 of Fig. 18;
Fig. 24 is a section on line 24—24 of Fig. 19;
Fig. 25 is a section on line 25—25 of Fig. 19;
Fig. 26 is a section on line 26—26 of Fig. 19;

Fig. 27 is a plan view of the ceiling structure shown in Fig. 7;

Fig. 28 is a side elevation showing the actuating mechanism of the disclosure of Fig. 27;

Fig. 29 is a fragmentary vertical sectional view through one end of a refrigerator car embodying a modified form of the invention;

Fig. 30 is a fragmentary vertical sectional view through one end of a refrigerator car embodying a modified form of the invention; and Fig. 31 is a transverse section showing a modified form of fuel container mounting.

In the present disclosure the concept is embodied in several forms, the variations in the forms comprising rearrangement of parts, but in each instance, generally producing the same results heretofore indicated as desirable in mechanically refrigerated cars.

In Figs. 1, 2 and 3 the car center sill is indicated at 1 with cross bearers 2 and supporting wheels indicated in dotted lines by reference character 3. In this disclosure the lading space is defined by end wall 4, side wall 5, bottom 6 and top wall 7, these walls being contained within and spaced from the insulated car body to permit circulation of cold air from the refrigerating unit. The insulated car body in Fig. 1 includes a disclosure of bottom 8, ceiling 9 and an end wall including a vertical portion 10 spaced inwardly from the car end and outwardly and upwardly inclined wall 11 defining the inner wall and top of the refrigerator unit compartment. An outer end wall 12, the latter including a hinged closure plate 14 and a plug 15, forms the outer wall of the unit compartment. The closure plate 14 is in the nature of a door having a handle 16 mounted on hinges 17 for swinging movement outwardly to permit inspection, adjustment and repair of the compressor condenser unit A supported on a suitable mounting B, preferably resilient in nature, supported on the fuel tank C forming the bottom of the unit compartment. In this disclosure, the fuel tank C is directly supported by and secured to the car frame and forms a reinforced structure at the frame end providing transverse equilibrium at this point. It will be noted that the inclined insulated wall 11 forms a partition defining two compartments at the end of the lading housing and supported at one extreme end of the car structure. Actually the end insulated wall defines one end of the car and the compressor condenser unit with its power plant and fuel tank is spaced outwardly of a shortened refrigerator car body.

Referring to Fig. 3 it will be seen that removable end plates 20 are provided in the side walls of the car opposite the refrigerating unit, these plates being provided with suitable louvers to permit ventilation within the unit housing and permitting removal of the unit where such removal is desirable or when a new unit, or unit part, is to be substituted. Suitable fastening means such as bolts 21 are provided which can extend through a portion of the unit structure and the flange of its mounting. In Fig. 1 the evaporator is illustrated at 23, this evaporator being of any desirable form and being inclined to lie generally parallel with the top surface 24 of the inclined insulated wall 11 along which the air travels from about the lading container to the blower 25 shown mounted on the platform 26 adjacent the upper passageway 27 to lift the chilled air and to direct it through its proper path to produce the desired results on the lading, as will be more fully hereinafter described. Intermediate the upper extremity of the inclined insulated wall 11, which terminates generally flush with the inner face of the car end 12, and the insulated roof structure 9, is the elongated plug 15. This plug has inwardly tapered faces 30 and is secured in place by suitable bolts 31. By providing this elongated plug which has overall dimensions permitting the removal of the evaporator 23 therefrom, it will be possible to remove the evaporator, disconnecting the latter at 32. The purpose of the inclined wall 11 and the corresponding inclined evaporator 23 is so that in a minimum of space it is possible to secure a maximum travel of the air over the evaporator coils and at the same time utilize a minimum of space at the end of the car structure. The arrangement further facilitates the inspection and handling of the evaporator assembly through the plug 15.

By the structure described, the compressor condenser unit, its power plant and evaporator coil and the fuel tank are consolidated into a minimum space but are still available for inspection, repair or removal. In addition, the consolidation of the parts in a minimum of space also comprehends the novel arrangement of evaporator coil and flow path for controlling the temperature of the lading.

Figure 5:
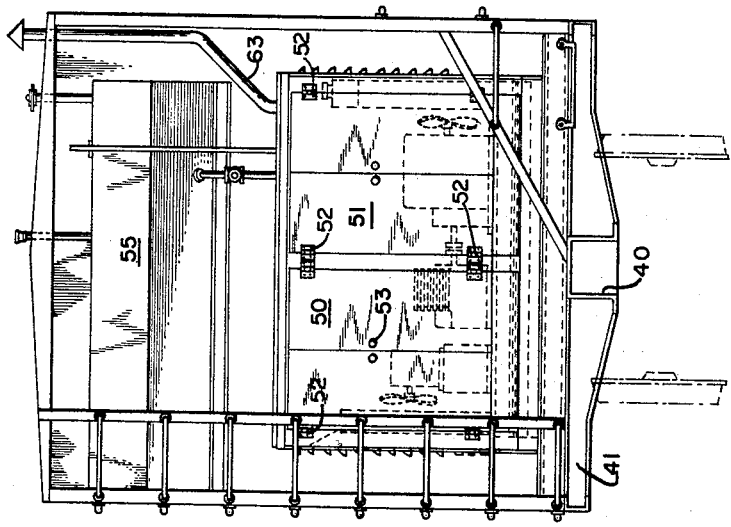
Fig. 5 is an end elevation of the disclosure of Fig. 4.
Figure 4:
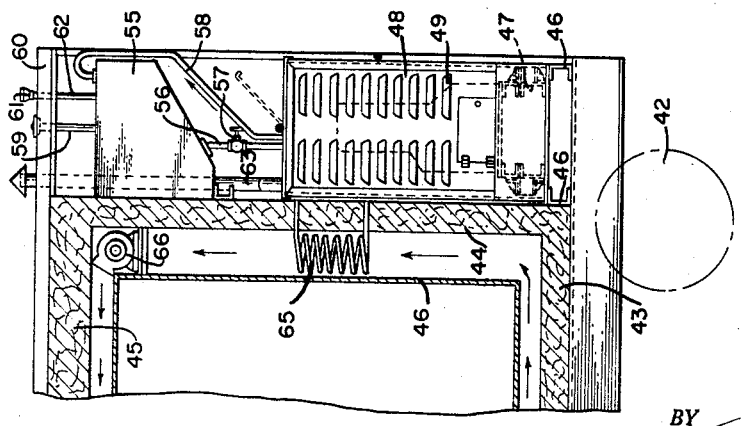
Fig. 4 is a vertical section through an end of a refrigerator car showing another form of the invention.

A second form of the present invention involving the same concept but with different arrangement of associated parts is disclosed in Figs. 4 and 5. In this disclosure the center sill is indicated at 40 with the cross bearers shown at 41. The wheels are indicated in dotted lines at 42. On this underframing is the insulated car body including the floor 43, and end wall 44 and ceiling 45, with the lading holding compartment at 46 generally spaced from the car wall structures 43, 44, and 45 to facilitate the passage of the cooling current. As in the previously described form, the end insulated wall 44 of the car terminates short of the frame to provide an area in which there is a compartment for conveniently confining the essential elements of the mechanical refrigerating system. In this disclosure supporting angles are shown at 46 on the end of the car frame and outwardly of the end of the insulated end of the car wall 44, these angle members 46 having mounted thereon a resilient supporting structure generally indicated at 47, this resilient mounting supporting the mechanical refrigerating unit 48 shown as contained in a metallic compartment, the end walls of which are provided with louvers 49 to facilitate the movement of cooling air therethrough. In this structure there is shown in Fig. 5 in dotted lines the essential parts of the mechanical refrigerating unit and access to these parts is through hinged doors 50 and 51, these doors being mounted on hinges 52 and locked in closed position through suitable fastenings indicated at 53. The doors are at the end of the mechanical refrigerating compartment with the unit extending transversely of the car structure and this arrangement provides for transverse counterbalance and permits the inspection and repair of the entire structure through any one of the doors as may be necessary.

In the assembly of Figs. 4 and 5 the fuel tank 55 is shown positioned above the refrigerating unit, the feed from the tank to the engine in the unit assembly being by gravity through the pipe 56 having a control valve 57 for regulating the delivery therethrough. A return fuel pipe is shown at 58 for returning excess fuel not required by the engine. A filler pipe 59 extends through the roof extension 60 and a filler cap 61 is provided for the filler pipe so that the fuel tank 55 can be filled through the top of the car. A suitable vent pipe 62 also projects upwardly from the tank through the roof to discharge gases from the fuel tank. The power motor for the compressor condenser unit may be an internal combustion engine or a diesel and the exhaust from this motor may be discharged through exhaust pipe 63 which projects through the car roof extension 60, or this exhaust pipe may be extended through the fuel tank 55 for the purpose of warming the fuel contained therein. The evaporator 65 shown as a vertical coil is connected to the refrigerator unit in the usual manner and is positioned vertically in the passageway between the end insulated wall 44 of the car and the adjacent end of the lading container 46. A blower 66 is mounted at the top of the passageway directing the flow of the current of air across the upper surface of the lading container 46 in accordance with requirements as determined by standard equipment such as thermostats or the like.

Figure 6:
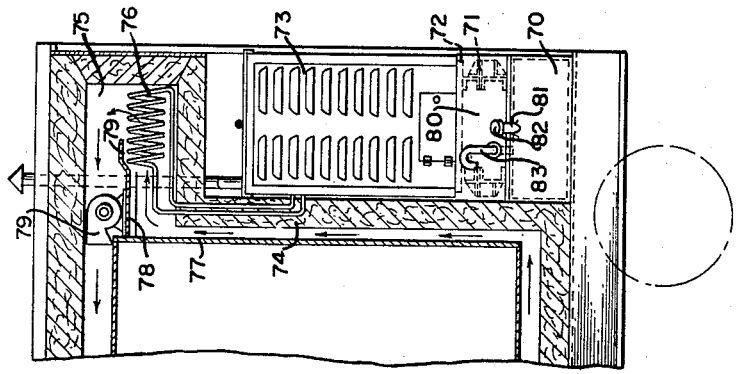
Fig. 6 is a vertical section of the end of a refrigerator car unit embodying a third form of the invention.

In Fig. 6 the structure somewhat resembles the arrangement of Fig. 1 in that the fuel tank 70 is mounted on the outer end of the car underframe and forms a support for the mounting for the mechanical refrigerating mechanism, this mounting being indicated at 71 and preferably including resilient factors. As clearly indicated, the mounting includes suitable arrangement of superimposed channels and supports a base plate 72 on which a housing 73 is positioned, the housing 73 extends transversely of the car and includes the mechanical refrigerating parts and the motor therefor as shown generally in Fig. 5.

In the disclosure of Fig. 6 the insulated end wall 74 of the car body extends vertically to a position substantially above the unit housing and then projects outwardly from the wall 74 in a general horizontal plane to provide a chamber 75 in which the evaporator coil 76 is located, this coil being shown as generally horizontally arranged and having suitable connection with the refrigerating unit as is customary in such instances. The lading compartment 77 is spaced from the insulated wall of the car to provide for passage of the cooled air and at the upper portion of the end wall of the lading container a shelf 78 extends horizontally having an upwardly offset portion 79 extending over the evaporator coil 76. This shelf serves two functions. In the first place it supports the blower 79 which directs the flow of air towards and through the evaporator 76. The mechanical refrigerating unit in the housing 73 is provided with an end doorway 80 to give access to the end portions of the chamber. In this disclosure the fuel tank 70 is filled through the filler pipe 81 having the usual closure cap 82, while a vent 83 provides for the venting of the tank. In the assembly of Fig. 6, as well as in the assembly of Fig. 4, the mechanical refrigerating unit except for the evaporator coil is located on what might be termed an end porch assembly and is contained in a specially built compartment which is counted on supports seating on the top of the fuel tank. In this disclosure all of the parts are accessible through the doorways provided, thus permitting inspection and repair from the outside of the car and without the provision of clearances within the car which would tend to reduce the capacity of the lading body structure.

In Fig. 7 there is shown a further modification of the present concept, insofar as the construction and arrangement of the mechanical refrigerating unit is concerned and its support with respect to the car structure. Fig. 7, as previously indicated, is a longitudinal sectional view illustrating a car designed in accordance with the present invention, this structure having the underframing indicated generally at 90 with wheels 91. A floor plate 92 is supported by the framing 90 and extends from end to end of the car. Supported on the car body is the main refrigerating car structure including bottom wall 93, end wall 94 and ceiling 95, the lading body within this insulated car structure being defined generally by the flooring 96, end walls 97 and 98 and ceiling structure 99, the parts of the lading housing being appropriately spaced with respect to the insulated wall structure to provide flues about the entire lading body, the direction of air flow being determined by the position of the circulating fan 100 with respect to the evaporator coil 101 and the various dampers to be hereinafter described. The evaporator coil is, of course, suitably connected through pipes 102 and 103 with the compressor condenser unit in the compartment 104 mounted at one end of the car body and outside of the lading carrying structure, this arrangement providing, as heretofore stated, appropriate support of the refrigerating unit on the underframing of the car and transversely of the car body to obtain proper balance and distribution of weight. The compressor condenser unit may be driven by any type of motor but preferably by a diesel and will include complete motor generator stand-by equipment when and if required.

Refrigerator cars of the type shown in Fig. 7 include suitable underframing such as indicated at 90 and the inside lining heretofore mentioned forming the lading compartment which is supported by cross stays 107 which are of suitable number and space the shell from the insulated main car structure. The floor of the lading compartment defined by the shell is defined by the removable interchangeable floor racks 96 of suitable structure and design to support the lading and permit passage of air therethrough. The forward end wall of the shell indicated at 97 is positioned and supported by the horizontal braces 107 which are connected to the adjacent main insulated end wall structure which includes the inner liner 108 and the outer wall 109 between which the insulation 94 is positioned. This insulation in the wall and in the other walls is shown as of blanket form but any standard insulation may be used, although in the present structure it is preferred that glass fibers be used.

The ceiling 99 of the lading compartment is formed with a multiplicity of transverse openings 110 closed by hinge flaps 111, this ceiling structure 99 of the lading compartment being formed of sheet aluminum and being supported by the vertical stays 112 which are secured to the aluminum ceiling parts and anchored at 114 to the main insulated car wall structure. The number of air openings or passageways controlled by the flaps 111 may be varied and the size of these openings and the operation of the flaps may be modified as found advisable to supply suitable flow of cooled air into the lading body. It will be noted that the flaps 111 controlling the openings 110 open upwardly in a manner to intercept the air flow from the blower 100 for diverting portions of the air flow into contact with such lading as may be contained within the body structure of the lading chamber. The opposite end 98 of the lading body structure is in the form of a suspended braced panel and is spaced from a vertical sheet 115 to define an air flow passageway. The vertical sheet 115 is connected by braces 116 with the corrugated end wall of the car 117 and it will be understood that insulation in any suitable form or type will be placed in this end structure between the walls 115 and 117, the present disclosure being for the purpose of illustrating the structure between the walls.

In Figs. 27 and 28 a more detailed disclosure of the ceiling structure and the flap control mechanism is shown. In these figures the flaps 111 are shown fixed to rods 111a, these rods extending transversely of the car and being connected by links 111b to a rail member 111c which is shifted forwardly and rearwardly by an arm 111d pivoted to the frame at 111e. Preferably the arm 111d is actuated with the conventional snap action over dead-center control utilizing the usual spring so that it will hold its two operative positions forwardly and backward, as is customary in such mechanisms.

In Figs. 8 and 9 sectional views of the car assembly of Fig. 7 are illustrated, these views showing the vertical or side walls 120 and 121 of the inner lading compartment spaced with respect to the insulated walls, and the flow of refrigerated air from the upper air chamber between the ceiling 99 of the lading container and the insulated wall 95. It will be noted that the flow of air is not only lengthwise of the car, but likewise the air is dispersed vertically downward about the side walls of the lading compartment and beneath the floor racks 96, which as previously stated are of slat form to facilitate the passage of the coolant. In Fig. 8 the arrangement of the support for the insulating panels or blocks is shown with medial longitudinal supports 122 spaced at appropriate points to prevent the settling and integration of the insulating structure. The number and position of the supporting elements 122 may be varied in accordance with the dimensions of the insulating blocks or panels. The section in Fig. 9 is taken through that portion of the car including the insulated door assembly 123, this door assembly being insulated and including vertical inner corrugated facing 124, to be more fully hereinafter described. The inwardly tapered faces 125 of the door are provided with appropriate seals 126 likewise to be more fully hereinafter described.

In Figs. 10 and 11 there is a partial sectional view through the upper portion of a car structure and in this disclosure the air flow between the roof structures is through channelways 130, these channelways being formed with a plurality of perforations 131. The channelways are closed at one side by the upwardly extending flange 132 likewise perforated at 133 and this flange 132 has a marginal flange portion 134 which is suitably secured to the car ceiling structure. The other side of each of these air channelways is closed by elongated perforated plates 135 which are fixed to the side sheets 124 of the lading housing and are flanged at 136 to provide a marginal structure to be secured to the inner face of the car ceiling structure. Within this fabricated channelway there is a U-shaped perforated channel 137 having flanges 138 and 139 which abut the upright walls of the fabricated main channelway 130. These parts are all perforated and the inner channelway 137 is slidable by operation of a lever arm 140 pivoted to a bracket at 141 and having a yoke 142 engaging a pin end 143 extending through the flanges of the inner channel 137. A slot 144 limits the movement of the pin 143. By this structure the perforations in the air ducts can be modified by operating the lever 140 to limit or vary the amount of coolant delivered from the blower through the channelway. There are two channels of identical structure positioned at each side of the upper or ceiling portion of the lading housing and the inner sliding channels 137 are simultaneously actuated by the cross pin 143, the ends of which form the structure for operating in the slots 144. By this means a slidable single lever arm uniformly actuates the parts delivering and controlling the cooled air.

In Fig. 12 the passage of the cooled air into the lading chamber flows through longitudinal slots 150 and 151 along the longitudinal marginal edges of the roof, these slots being provided with hinged sealing plates 152 and 153, respectively, each of which is mounted on pivots 154 and operated by handles 155 working in arcuate racks 156. The movement of the arms 155 which are fixed to the plates 152 and 153 will result in movement of these plates to open or closed position, the fully open position being shown in dotted lines at 157, resulting in restricting the lateral flow of air about the side walls of the lading housing. Obviously by moving the hinged plates 152 and 153 the flow of air into the lading chamber can be modified or controlled in accordance with the requirements of the lading contained therein. This form of control has a single air channel at the ceiling.

Figure 13:
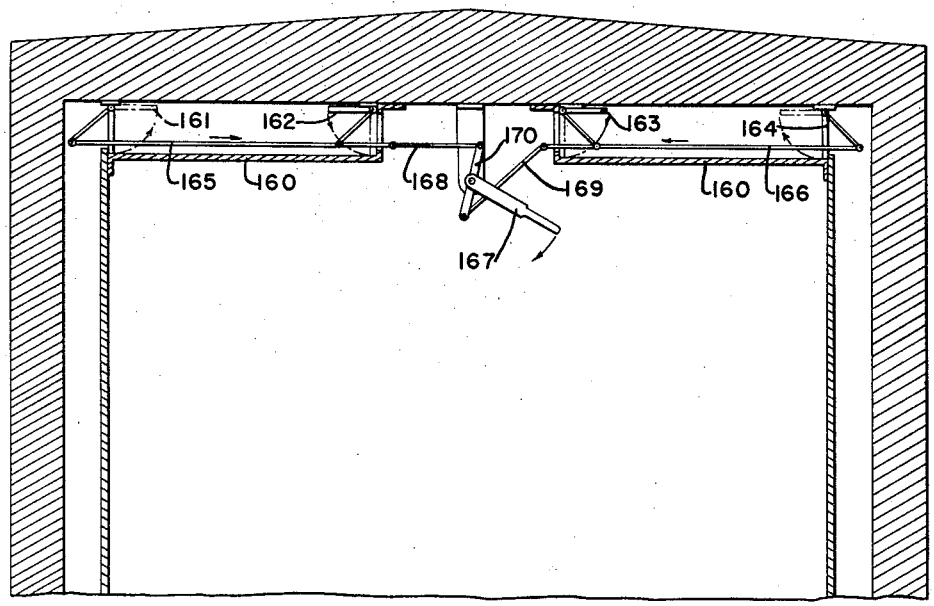
Fig. 13 is a fragmentary vertical sectional view through the upper portion of a car structure embodying a further modified form of refrigerated air control.

In Fig. 13 the lading chamber ceiling 160 is interrupted centrally and longitudinally of the car and the two channelways for discharging the cooled air into the lading chamber and/or into the vertical side air passages at each longitudinal side of the lading chamber is controlled by a plurality of hinged gates 161, 162, 163 and 164. These gates are hinged at each longitudinal edge of the two spaced ceiling air channels 160 and are controlled by connecting links 165 and 166 by the actuation of a control arm 167 connected therewith by links 168 and 169, these links 168 and 169 being connected to the opposite end of the medially pivoted cross rod 170 to which the actuating handle is connected. Throughout the length of the car there can be a series of arrangements as described for controlling the flow of air into different portions of the lading chamber body in accordance with requirements. It will be noted that the hinged doors 161, 162, 163 and 164 are so pivoted that when the inner door is open the outer door is closed. This structure tends to direct the flow of air alternately into the center of the lading chamber or vertically down the outer side walls of such chamber. Likewise, the control mechanism is such that the position of these doors can be set to assure predetermined flow passage of the refrigerated air.

While normally the side walls of the inner lading chamber provide space for the flow of coolant, it will be obvious that at the door area this inner lading side wall structure must be modified to permit access to the compartment for loading and unloading. This interruption in the side walls, and consequently interruption in the flow of coolant, is corrected by a novel door structure shown in Figs. 14, 15 and 16. The door structure consists of an outer plate 171 reinforced by a pair of vertical channels 172 and a horizontal medially positioned channel 174, the latter being interrupted at points of intersection with the vertical channels 172 and all of the channels being welded or otherwise secured to the outer plate 171, thus providing for vertical and horizontal stresses. A central vertical channel 175 of less diameter than the outer channels 172 is provided and seated thereon is a wooden filler 176 which, with the channels, extends the full width of the door structure to transmit load from the outside plate 171 to the inside vertically corrugated plate 177. Studs 175a are fixed to the channel 175 and extend through the filler 176. The vertical corrugations in the plate 177 are relatively large so that when an inner sealing sheet 178 is placed thereon vertical ducts 179 are provided for the flow of air about the lading in the area of the door. The area between the outer plate 171 and the corrugated plate 177 is filled with a suitable insulating material. Outer plate 171 and corrugated plate 177 terminate in the offset binding 180 which in turn terminates in the outward flange 181. Flange 181 is attached by suitable fasteners to the marginal edges of outer plate 171. If desired the door parts can be made of aluminum or a light, strong plastic. The perfect construction being fiberglass reinforced plastic for the inner shell.

From Fig. 14 it will be obvious that the flanges about the edge of the door are riveted or otherwise secured into position so that the entire structure is a compact, well braced, insulated light door assembly including duct formations capable of transmitting the appropriate temperatures to the adjacent lading. It will also be obvious that the binding 180 is constructed to define offsets forming shoulders for sealing engagement with the adjacent parts of the door framing.

Figure 17:
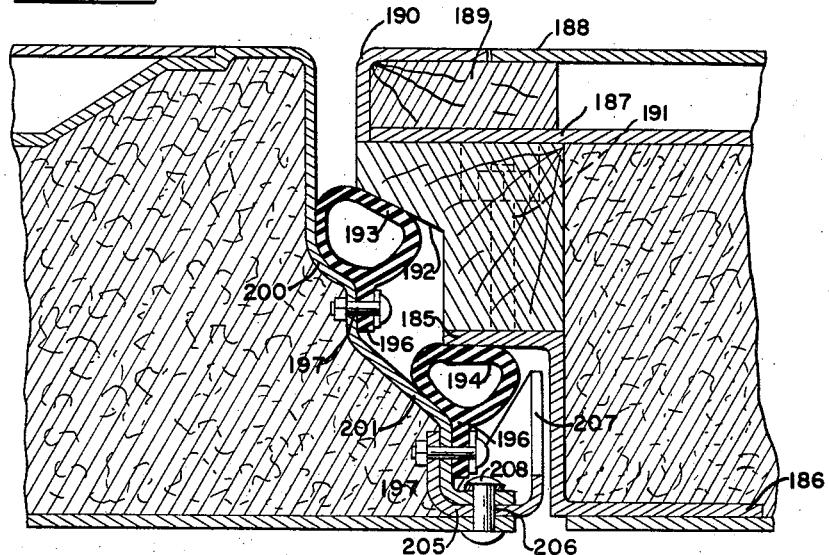
Fig. 17 is an enlarged transverse section showing the details of construction of the sealing for the door.

In connection with the sealing of the door, Fig. 17 shows a section through the door and through the door framing by means of which the door is guided into position, centered and sealed. The door framing includes the angle post 185 with its flange 186 fixed to the side wall structure. The car siding parts including inner plate 187 and outer side plate 188 embrace the filler block 189 and a cap plate 190 seals the ends of this structure. A wooden filler 191 is provided between the outer assembly and the inner flange of the metal post 185, the latter providing one offset for association with one of the door offsets, and the wooden filler having an inclined face 192 providing a further offset for seating of packing carried by the door binding or edge structure. The sealing is of tubular form including the hollow tubular bodies 193 and 194, each provided with projecting flanges 196 by means of which the sealing elements are bolted by bolts 197 to the adjacent car part.

The door sealing strips or edge plates are formed with inner arcuate surface 200 and inclined surface 201 which form smooth abutting shoulders for the tubular sealing elements, it being understood that the structures described extend entirely about the outer edge of the door to form a complete seal thereabout. As the door is moved to closed position as shown in Fig. 17, the sealing elements will roll into a sealing position forming a firm seal between the door and the door post structure at two spaced points, the tubular sealing itself providing insulation to prevent the transmission of heat through these parts, and the assembly in fact providing three separate air chambers about the door, two of the air chambers being formed by the tubular sealing structure per se and the third chamber being the area between the two sealing members. At the outer corner of the door four corner guides are provided which facilitate the movement of the door, centering the latter as it moves to closed position and thereby maintaining the sealing elements from distorted frictional engagement with the adjacent parts of the car which might cause damage to the sealing elements. These guides are in the form of channels 205 which are riveted at the corner of the door structure by rivets 206, the inner legs of the channel parts projecting far enough within the door to partly house the adjacent seal, as shown at 207. The inner flanges of the U-shaped guides abut the adjacent part of the door edge strip and secured thereto by rivets or bolts 208.

By references to Fig. 9 it will be seen that the air ducts formed by the corrugated inner door structure are aligned with the air flow space about the side of the car lading chamber and form a continuation thereof regardless of the position or condition of the lading.

As pointed out in connection with the disclosures of Figs. 1–7, inclusive, the basic concept is the mounting of the mechanical refrigerating unit assembly on the underframe structure of the car, but outside of the refrigerating car body, this placing the refrigerating unit on a roofed platform. It will, of course, be essential to confine the mechanical refrigerating unit and its fuel supply within a housing and this housing will include doorways, removable panels and other structural elements which must be constructed and arranged to provide the essential ventilation and at the same time permit access to the contained structures of the refrigerating unit.

In Fig. 18 there is a fragmentary side elevation showing the structure forming the side wall housing of the mechanical refrigerating plant, while in Fig. 19 is a similar view showing the opposite side of the compartment with its essential equipment. Fig. 18 shows the end of the right side of this structure which embodies a continuation of the adjacent car wall structure at 210 closing the upper part of the compartment, while the lower part is in the form of a removable panel 211 formed with a suitable array of louvers 212. Fig. 20 is a section on line 20—20 of Fig. 18 and is enlarged to show the details of the panel and its mounting. From this figure it will be seen that the removable panel includes a frame 213, the inner marginal edge of the frame defining the door opening and being angled inwardly at 214 and within this area the louvered sheet 212 is positioned and secured by welding or otherwise. The panel frame 213 is bolted to that portion defining the adjacent portion of the car side wall resulting from its standard fabrication. In Fig. 18 the conventional ladder 216 is shown, this ladder being placed at the end of the right end wall of the panel as shown.

The other end of the side of the compartment is shown in Fig. 19 with a vertical section therethrough in Fig. 21. In Fig. 19 the upper section of the end wall is formed as a removable panel corresponding in all respects to the removable panel at the other side of the car and indicated by reference character 213, the present panel being indicated at 213a and embodying a frame to which a louvered sheet is fixed to permit ventilation. Beneath the upper ventilating sheet 213a is a hinged louvered panel 217 and a removable panel 218 to permit access to the lower compartment enclosing the compressor condenser and motor assembly. The hinged panel 217 is hinged at 219 by hinges fixed to the adjacent frame structure and this hinged ventilating panel is locked by a swinging lock 220 carried by the removable panel 218, the latter being secured by bolts 221 located at appropriate points about the assembly as shown. The framing is generally along the line of the framing at the opposite end with the substitution of modified supporting features.

In order to obtain a better understanding, additional disclosures have been made in the form of sections, Fig. 22 being a section on line 22—22 of Fig. 18, this section being taken through the intake air or right side of the end and showing the ladder mounting which includes the vertical ladder framing 230 and 231 in the form of inwardly facing angle irons. The upper part of the angles are fastened to the upper part of the car at its extremity to permit flat faces of the structure as at 232, while the lower end 233 is fastened to the lower car frame. The latter is not fixed to the removable panel 213 at any point and is so spaced and positioned that provision can be made for securing the panel 213 by bolts and permitting it to be withdrawn.

In Fig. 23, which is a section through the lower panel 213, this view shows the panel framing along its vertical sides, which sides are fastened to the adjacent part of the fabricated car structure. This view clearly shows the louvers 212 and the full extent to which they are positioned flush with the outer surface of the car and throughout substantially the entire area of the panel. Fig. 24 shows the vertical marginal portions of the upper panel 213a of the other side of the car structure shown in Fig. 19, this figure showing the framing 213a with the louvers 213b, the framing being bolted to the car structure as in the previous views.

In Fig. 25 the section takes in the structure of the removable panel 218 and the hinged panel 217, this view illustrating the hinges 219 fixed to the car side and mounting the hinge panel 217 for outward swinging movement. This view also shows the handholds 220 bolted to the removable panel 218, the latter being bolted to the car side structure by bolts 221.

Figs. 29 and 30 show end sectional views of refrigerating cars in which an engine or power-operated refrigerating unit is mounted at the end of the refrigerating car and outwardly thereof. In both of these figures a refrigerating unit is illustrated at 200 with the evaporator 201 fed through the supply and return pipes 202 and 203. The evaporator is contained within the refrigerator car body with the insulated end wall 204 of the car body forming the partition separating the refrigerating unit supporting platform from the lading space. In both of these figures the refrigerating unit 200 is mounted on supporting girders 205 extending longitudinally of the car body with transverse channels 206 as shown.

The disclosures of Figs. 29 and 30 are primarily different in the method of mounting the fuel tank. In Fig. 29 the fuel tank 207 is supported on brackets 208 and 209, respectively, on the end car wall 210 and the refrigerator car wall or bulkhead 204. Rubber mountings 211 support the tank brackets 212 on the brackets 208 and 209, this arrangement resiliently suspending the fuel tank 207 outwardly of the lading body and immediately above the refrigerating power unit 200. The fuel is fed from tank 207 to the motor of the power unit through the pipe 214 with a return pipe 215 provided for the overflow from the fuel feed. In the disclosure of Fig. 29, as well as in the disclosure of Fig. 30, the arrangement of the evaporator coil is such as to permit a blower to determine the amount of cooled air about the lading through controlled ducts as heretofore described. A filler pipe 216 extends from the fuel tank 207 through the car roof and a vent pipe 217 is associated with the fuel tank as required. It will be noted that the feeding of the fuel from the fuel tank to the power plant is controlled by a valve 218.

Referring now to Fig. 30 it will be seen that while the disclosure is generally identical with the disclosure of Fig. 29, nevertheless there is a different arrangement of the fuel tank. In Fig. 30 the fuel tank 207a is mounted on the bulkhead by resilient supports carried on brackets 208a and 209a, this arrangement positioning the fuel tank 207a transversely of the car rather than longitudinally of the car as shown in Fig. 29. In Fig. 30 it will be noted that the arrangement provides more head room above the power unit and may be preferable for that reason. The fuel feeding system and supply is identical with the disclosure of Fig. 29 and the description of these parts is not deemed necessary.

In Fig. 31 the power refrigerating unit 220 is indicated in dotted lines and is shown as mounted to extend transversely of the end of the car platform by means of resilient supports 221 fixed to the bulkhead and to the end car wall. Immediately below the power refrigerating unit the fuel tank 222 is mounted on rubber mountings 223 carried on the car floor structure. In Fig. 31, as well as in the other figures, the proximity of the fuel to the motor tends to absorb sound waves set up by the refrigerating unit. This factor is more prevalent in such forms as those shown in Figs. 1 and 31 because of the association of the refrigerating unit with the fuel supply.

In the present disclosure it will be noted that the customary steel and wood stringer structure in the floor is eliminated. The practice of providing wood and steel stringers in the floor structure is, of course, expensive, complicated and cumbersome as well as inefficient insofar as it pertain to a refrigerator car. Obviously the large mass of wood with associated metallic connections within the floor will cause rapid heat leakage from without. This undesirable factor has been eliminated by use of a relatively heavy plate 225 which is welded to the underframe structure, Figs. 29 and 30, making the assembly a stronger unit construction than normal in cars of this type. On top of the plate 225 it is only necessary to attach two stringers at the extreme edges to which the deck boards are nailed and the block type insulation extends over the full area of the lading space. By this arrangement the deck boards rest on the outer stringers and on the insulation which means that the insulation has to carry and transmit loads imposed by the lading. A result of this efficient construction is reduction in heat leaks and cost.

What I claim is:

1. In a refrigerator car, an underframe, an insulated car body mounted on the underframe and having all of its walls insulated, said car body having one end offset outwardly to define an upper outwardly offset insulated chamber, a lading compartment comprising a shell-like body positioned within and spaced from all of the walls of the insulated car body and having passageways thereabout and therethrough for chilling lading contained therein, a mechanical refrigerating unit supported on the underframe outwardly of one end of the insulated car body and below the offset car body portion, said refrigerating unit being connected with an evaporator positioned within the offset car body portion, blower means arranged between the insulated car body and the lading container for moving cooled air through the evaporator and about the lading container, and a housing about the mechanical refrigerating unit, said housing having openings formed therein and closures for said openings, whereby access may be had to the refrigerating unit within the housing from outside of the insulated car body.

2. In a refrigerator car, an underframe, an insulated car body mounted on the underframe and having all of its walls insulated, said car body having one end terminating inward of one end of the underframe to provide a projecting supporting area at one end of the underframe outwardly of the insulated car body, the upper portion of said inward terminating end of said car body projecting outwardly and upwardly to provide an offset insulated compartment, the bottom wall of said offset insulated compartment projecting outwardly and upwardly at an angle, a mechanical refrigerating unit supported on the projecting supporting area of the underframe under said offset insulated compartment, an evaporator associated with the refrigerating unit and positioned in said offset insulated compartment with its axis parallel to the bottom angular wall thereof, blower means within the insulated body for moving cooled air through the evaporator and about the insulated car body, and a fuel container for the refrigerating unit.

3. In a refrigerator car, an underframe, an insulated car body mounted on the underframe and having all of its walls insulated, said car body having one end terminating inward of one end of the underframe to provide a projecting supporting area at one end of the underframe outwardly of the insulated car body, the upper portion of said inward terminating end of said car body projecting outwardly and upwardly to provide an offset insulated compartment, a mechanical refrigerating unit supported on the projecting supporting area of the underframe under said offset insulated compartment, an evaporator associated with the refrigerating unit and positioned in said offset insulated compartment, blower means within the insulated body for moving cooled air through the evaporator and about the insulated car body, and a fuel container for the refrigerating unit, said fuel container being directly supported by the projecting supporting area of the underframe and the mechanical refrigerating unit resting on resilient supports mounted on the top of said fuel container.

4. In a refrigerator car, an underframe, an insulated car body mounted on the underframe and having all of its walls insulated, said car body having the bottom portion of one of its ends terminating inwardly of the end of the underframe to provide a projecting supporting area on said underframe outwardly of the bottom portion of the insulated car body and beneath the upper projecting portion of the car body, a lading-containing shell positioned within the car body and spaced from the interior thereof to provide for the passage of refrigerated air therebetween, a door opening in said car body and in said lading shell, a door for said door opening, said door having an insulated outer wall and an inner surface, the inner surface being in alignment with the adjacent lading shell wall structure, vertical passages formed in said door in line with the air passages between the lading shell and the adjacent car body, whereby when the door is closed free passage of air about the car body will be uninterrupted in the area of said door, a roof for said refrigerator car projecting over the supporting area, and a mechanical refrigerating unit mounted on the underframe outward of the insulated car body, said mechanical refrigerating unit including an evaporator, said evaporator being located between the lading shell and said car body and within said upper projecting portion of the car body and formng a connected associated part of the mechanical refrigerating unit.

References Cited in the file of this patent

UNITED STATES PATENTS

| | | |
|---|---|---|
| 2,309,813 | Whiting | Feb. 2, 1943 |
| 2,311,622 | Alexander et al. | Feb. 23, 1943 |
| 2,530,241 | Harrington | Nov. 14, 1950 |
| 2,630,687 | Acton | Mar. 10, 1953 |
| 2,667,761 | Sellstrom | Feb. 2, 1954 |
| 2,678,546 | Campbell | May 18, 1954 |
| 2,780,923 | Jones | Feb. 12, 1957 |
| 2,874,554 | Elving et al. | Feb. 24, 1959 |
| 2,881,600 | Elving et al. | Apr. 14, 1959 |